(12) United States Patent
Kawai (10) Patent No.: US 7,201,352 B2
(45) Date of Patent: Apr. 10, 2007

(54) CABLE CLAMP

(75) Inventor: Yasuhiro Kawai, Toyohashi (JP)

(73) Assignee: Newfrey LLC, Newark, DE (US)

( * ) Notice: Subject to any disclaimer, the term of this patent is extended or adjusted under 35 U.S.C. 154(b) by 41 days.

(21) Appl. No.: 10/768,137

(22) Filed: Feb. 2, 2004

(65) Prior Publication Data

US 2004/0182973 A1  Sep. 23, 2004

(30) Foreign Application Priority Data

Feb. 10, 2003  (JP) .............................. 2003-032014

(51) Int. Cl.
*F16L 3/08*  (2006.01)
*F16L 3/22*  (2006.01)
(52) U.S. Cl. .................... 248/74.1; 248/68.1; 403/397; 24/543
(58) Field of Classification Search ............... 248/68.1, 248/74.2, 222.12, 229.26, 71, 73, 70, 74.1, 248/74.3, 316.5, 316.7; 439/460; 174/49, 174/135, 99 R, 109; 24/487, 542, 543
See application file for complete search history.

(56) References Cited

U.S. PATENT DOCUMENTS

| 4,653,716 A * | 3/1987 | Sakaguchi .............. 248/316.5 |
| 4,669,688 A * | 6/1987 | Itoh et al. ................. 248/74.2 |
| 4,881,705 A * | 11/1989 | Kraus ...................... 248/74.2 |
| 5,535,969 A * | 7/1996 | Duffy, Jr. .................. 248/68.1 |
| 6,809,257 B2* | 10/2004 | Shibuya ...................... 174/49 |
| 2004/0182973 A1* | 9/2004 | Kawai ........................ 248/71 |
| 2005/0079756 A1* | 4/2005 | Kawai et al. ............... 439/460 |

FOREIGN PATENT DOCUMENTS

| EP | 1445845 | * 11/2004 |
| JP | UM55-120873 | 8/1980 |
| JP | 2-292591 | 12/1990 |
| JP | UM4-75289 | 6/1992 |
| JP | 10-136539 | 5/1998 |
| JP | 11-69573 | 3/1999 |

* cited by examiner

*Primary Examiner*—Carl D. Friedman
*Assistant Examiner*—Tan Le
(74) *Attorney, Agent, or Firm*—Miles & Stockbridge P.C.

(57) ABSTRACT

A cable clamp comprises an anchor to be fixed to a workpiece, a clamp portion for clamping a cable, and a flexible protection member for protecting the cable. The anchor and the clamp portion are integrally molded. The clamp portion includes a holder having a concavity, and a cover for closing the concavity. The cover has one end connected to one end of the holder by a hinge. The other end of the cover and the other end of the holder have cooperable latch portions adapted to be latched to one another. The protection member includes a holder-side portion fixed to the holder, and a cover-side portion that extends substantially parallel to the cover in its open state and that is pressed by the cover in its closed state to envelop the outer surface of the cable in cooperation with the holder-side portion.

22 Claims, 8 Drawing Sheets

CABLE CLAMP

CROSS-REFERENCE TO RELATED APPLICATION

This application claims the benefit of Japanese Patent Application No. 2003-032014 filed Feb. 10, 2003, incorporated herein by reference.

BACKGROUND OF THE INVENTION

The present invention relates to a cable clamp for use, for example, in attaching a cable, such as a signal cable for a speed sensor of an anti-lock braking system (ABS), to a workpiece such as a body panel of an automobile.

In attaching a cable, such as a signal cable for a speed sensor of an anti-lock braking system (ABS), to a workpiece such as a body panel of an automobile, a protection member is wrapped around the outer surface of the cable. Then, the cable with the protection member is held by a cable clamp, and the clamp is attached to the body panel.

Japanese Patent Laid-Open No. 11-069573 (Publication 1) discloses a cable holder for use in wiring an ABS sensor cable from a wheel housing into an engine compartment through a partition wall therebetween. This cable holder is designed to allow the cable to pass through a mounting hole of the partition wall, and then hold the cable without any rotation and axial movement relative to the partition wall.

Japanese Utility Model Laid-Open No. 55-120873 (Publication 2) discloses a fastener for attaching an elongated member such as a wire harness to a panel. This fastener has a U-shaped holding portion, a cover portion for closing an opening of the holding portion, and an anchor-leg-shaped anchor adapted to be inserted into a mounting hole of a panel and engageably fixed to the panel. A wire harness or the like is fixed to the fastener by inserting the wire harness or the like into the U-shaped holding portion through the opening, and rotating the cover about a hinge at one end of the cover to bring the other end of the cover into engagement with a latch of the holding portion. Then, the anchor can be inserted into the mounting hole to fix the entire fastener with the wire harness or the like to the panel.

Japanese Patent Laid-Open No. 02-292591 (Publication 3) discloses an anti-vibration clamp for supporting a tube or the like. This anti-vibration clamp holds an insulator (vibration isolator) made of soft resin material. A tube or the like is put in the clamp, and a cover connected to the clamp through a hinge is closed to hold the tube or the like in the clamp. The anti-vibration clamp includes an anchor adapted to be inserted into a mounting hole of a panel and fixed to the panel so as to allow the tube or the like to be attached to the panel in a vibration-isolation state.

Japanese Utility Model Laid-Open No. 04-75289 (Publication 4) discloses an anti-vibration clamp having a configuration different from that of Publication 3. In this anti-vibration clamp, an anti-vibration portion for holding a tube or the like is made of soft resin material, and divided into two portions, each holding one-half of the periphery of the outer surface of the tube. One of the divided anti-vibration portions is fixed to a U-shaped holding portion, and the other anti-vibration portion is fixed to a cover connected to the holding portion through a hinge. The anti-vibration clamp includes an anchor adapted to be fixed to a panel. When the cover is moved to close an opening of the holding portion, the anti-vibration portions can surroundingly hold the tube or the like, and the tube or the like is attached to the panel through the anti-vibration portions in a vibration isolation state.

Japanese Patent Laid-Open No. 10-136539 (Publication 5) discloses a holder for holding a cable or tube to a panel or the like. This holder comprises a base including an anchor adapted to be fixed to a panel, and a cover connected to the base through a hinge. A thermoplastic elastomer member is fixed to each of the base and the cover. After the cable or the like is positioned between the respective elastomer members of the base and the cover, the hinged cover is closed to hold the tube or the like in the holder. Then, the anchor of the base can be inserted into a mounting hole of the panel to allow the tube or the like to be attached to the panel under the protection of the elastomer members.

It is undesirably troublesome to wrap a protection member around the outer surface of a cable, and then hold the cable with the protection member by a cable clamp, and then attach the cable clamp to a body panel. Although the cable holder disclosed in Publication 1 (Japanese Patent Laid-Open No. 11-69573) is suitable for holding a cable when the cable penetrates a partition wall, it cannot be used to fix a cable to a body panel or the like. The fastener disclosed in Publication 2 (Japanese Utility Model Laid-Open No. 55-120873) can be used as a conventional cable clamp for fixing a cable or the like to a body panel or the like. However, that fastener involves the risk of damaging the outer surface of a cable or the like to be held, due to lack of a structure for holding the cable or the like while protecting it from damag. Thus, a troublesome operation of wrapping a protection member around the outer surface of the cable is undesirably required. While the anti-vibration clamp disclosed in Publication 3 (Japanese Patent Laid-Open No. 02-292591) includes a structure for protectively holding a tube or the like, it has a relatively low holding force due to a tube or the like being supported by an insulator (vibration-isolation material) made of quite soft material. Therefore, that anti-vibration clamp is not suitable for immovably holding a cable or the like. The anti-vibration clamp disclosed in Publication 4 (Japanese Utility Model Laid-Open No. 04-75289) includes an anti-vibration portions for protecting a tubular member. However, when the U-shaped holding portion is opened, the cover closing the holding portion is turned to a position substantially parallel to the holding portion. This makes necessary the provision of a large space for widely opening the cover. Thus, the anti-vibration clamp is not suitable for use in a limited space such as a wheel housing or engine compartment. Although the holder disclosed in Publication 5 (Japanese Patent Laid-Open No. 10-136539) includes a structure for protectively holding a cable or the like, the cover-side elastomer member is fixed to the cover, and in opening of the holding portion the cover is turned over to a position approximately parallel to the holding portion. Thus, the holder is not suitable for use in a limited space such as a wheel housing or engine compartment, due to the need for providing a large space for opening the cover.

BRIEF DESCRIPTION OF THE INVENTION

It is therefore an object of the present invention to provide a cable clamp capable of protectively holding a cable, such as an ABS sensor cable, and facilitating an attaching operation in a narrow space.

In one embodiment, a cable clamp of the present invention comprises an anchor adapted to be fixed to a workpiece such as a body panel of an automobile, a clamp portion for holding a cable, and a flexible protection member for allowing the cable to be protectively held by the clamp portion. In this cable clamp, the anchor and the clamp portion are integrally molded as one piece with hard resin (plastic), and the clamp portion includes a holder having a receiving concavity for receiving the cable therein, and a cover for closing the opening of the receiving concavity of the holder. The cover has a first end connected to a first end of the holder adjacent to the opening through a hinge. A second end of the cover and a second end of the holder adjacent to the opening have cooperable latch portions formed to be latched to one another. The protection member includes a holder-side portion fixed to the holder to partially envelop an outer surface of the cable received in the receiving concavity, and a cover-side portion standing and extending from the holder-side portion at a position adjacent to the hinge. The cover-side portion is formed to extend substantially in the same direction as (e.g., parallel to) and apart from the cover under its open condition and adapted, in response to closing of the cover, to be pressed onto the cable by the cover so as to partially envelop the outer surface which is not enveloped by the holder-side portion.

According to the above cable clamp, a cable, such as an ABS sensor cable is held in the cable clamp by only an operation of positioning the cable on the holder-side portion of the protection member and then closing the cover so that the protective member envelops the cable. This eliminates the need for a separate operation of wrapping the protection member. The anchor and the clamp portion are integrally molded as one piece with hard resin, and the cable protected by the flexible protection member is pressed to the holder by the cover and held by the clamp portion. Thus, the cable is held firmly and protectively. Furthermore, the cover-side portion of the protection member extends from the holder-side portion when the cover is in its open condition, without any contact with the cover. Thus, the cable can be readily positioned on the protection member without widely opening the cover, so as to facilitate an attaching operation in a narrow space.

In the above cable clamp, the holder may have a pair of walls which form the receiving concavity into a U-shaped configuration. In this case, the cover may be formed to extend from an end of one of the walls through a hinge in parallel to a straight region of the wall to maintain the receiving concavity opened. This structure can minimize a space occupied by the cover in its open state.

In the above cable clamp, the cover-side portion of the protection member may be formed to have a length which extends in parallel to the cover up to an intermediate height of the cover. Alternatively, the cover-side portion of the protection member may have an upright segment extending parallel to the cover up to the intermediate height of the cover, and an extension segment extending continuously from the upright segment and having an end connected to an upper portion of the cover. The extension segment can block a part of the opening above the upright segment and on the side of the cover to prevent wrong alignment of a cable with the opening. Further, the cable can be adequately guided toward the holder-side portion to reliably position the cable on the holder-side portion of the protective member.

In the above cable clamp, a portion of the cover for pressing the outer surface of the cable through the protection member may be formed with a protruding rib which presses the cable through the protection member upon closing of the cover to prevent the cable from being axially moved. The protruding rib makes it possible to hold the cable more firmly. In addition to the hinge, each of the first end of the holder and the first end of the cover may be formed with another engagement means adapted to be connected with one another when the cover is in its closed state.

In the above cable clamp, the anchor may include a base to face a front surface of the workpiece, at least one engagement pawl adapted to be inserted into a mounting hole of the workpiece and brought into engagement with a rear surface of the workpiece, and a pair of resilient wings extending from the base and adapted to resiliently engage the front surface of the workpiece so as to absorb a change in thickness of the workpiece and maintain the engagement function of the engagement pawl. The engagement pawl (or pawls) allows one kind of cable clamp to be used even if the workpiece is varied in thickness.

Further, in the above cable clamp, the anchor and the clamp portion may be integrally molded with hard resin into one piece in a primary molding and the holder-side portion of the protection member is formed to join with the holder. The receiving concavity of the holder is formed with a bridge having a hole between the bridge and a surface of the concavity. In a secondary molding, the protection member may be formed such that the holder-side portion envelops the bridge. This structure allows the protection member to be securely fixed to the holder and reliably prevented from peeling from the holder. The protection member may be formed through a double-shot molding or insert molding. This process can reduce a processing time for combining the protection member with the primary product.

BRIEF DESCRIPTION OF THE DRAWINGS

The invention will be further described with reference to the accompanying drawings, which illustrate preferred (best mode) embodiments, and wherein.

DETAILED DESCRIPTION OF THE INVENTION

Figure 9:
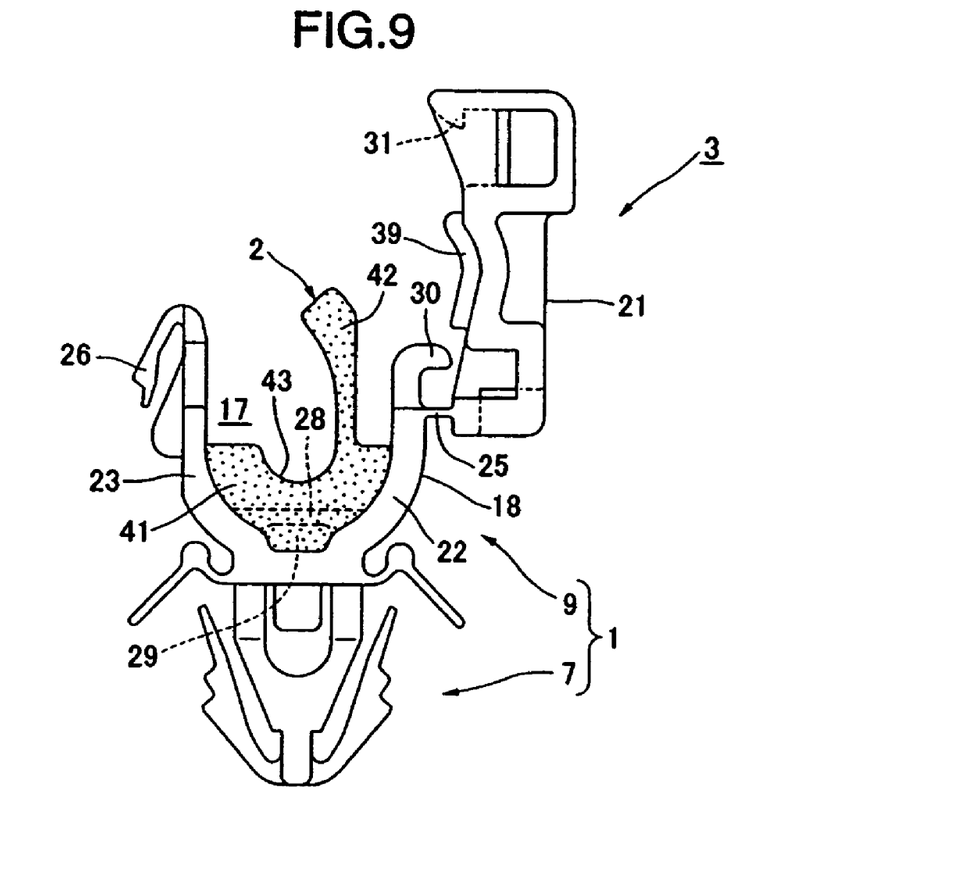
FIG. 9 is a front view of a cable clamp according to a first embodiment of the present invention, shown after a protection member is formed or attached to the clamp of FIG. 1.
Figure 10:
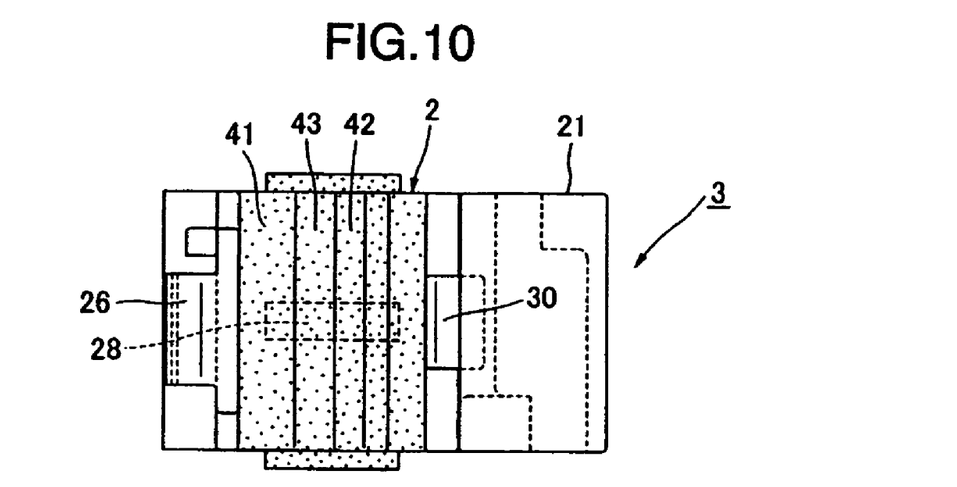
FIG. 10 is a top plan view of the cable clamp in FIG. 9.
Figure 11:
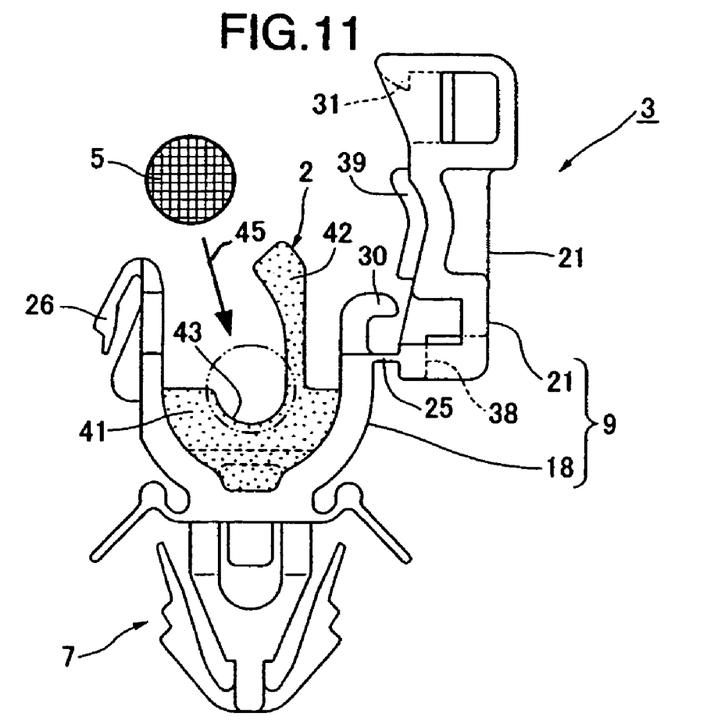
FIG. 11 is a front view of the cable clamp in FIG. 9 before a cable is held by the cable clamp.
Figure 12:
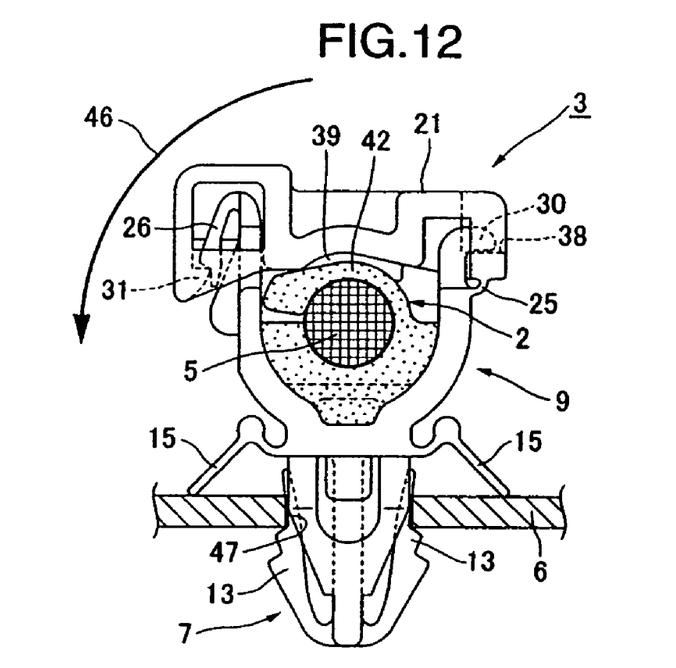
FIG. 12 is a front view of the cable clamp in FIG. 11 after a cable is held by the cable clamp, and the cable clamp is attached to a body panel.

With reference to the drawings, a cable clamp for clamping a cable, such as a cable of an ABS (Anti-lock Breaking System), according to an embodiment of the present invention will now be described. FIGS. 1 to 12 show a cable clamp according to a first embodiment of the present invention, wherein FIGS. 1 to 8 show a clamp 1, as a primary mold product, made of hard synthetic resin material and having no protection member thereon, and FIGS. 9 and 10 show a cable clamp 3 having a protection member, according to the first embodiment of the present invention. The cable clamp 3 is a secondary mold product (the final product) in which a flexible protection member 2 made of soft resin is formed on a predetermined position of the clamp 1 as the primary product. FIGS. 11 and 12 show an operation of holding a cable 5 to the cable clamp 3 and fixing the cable clamp with the cable to a workpiece such as a body panel 6 of an automobile.

First, with reference to FIGS. 1 to 8, the primary product clamp 1 will be described. The primary product clamp 1 comprises an anchor 7 (enclosed in a box shown by a chain line at the lower portion of FIG. 1) adapted to be attached to a workpiece such as a body panel, and a clamp portion 9 (enclosed in another box shown by a chain line on the upper side of FIG. 1) for holding a cable. The anchor 7 and the clamp portion 9 are integrally molded with hard synthetic resin material as one piece to provide the clamp 1 as a primary mold product.

The anchor 7 may be any suitable type capable of being fastened or attached to a workpiece such as a panel. For example, as illustrated, it may be an anchor-leg-shaped anchor adapted to be inserted into a mounting hole of a workpiece. Where a workpiece has a T-stud or stud bolt (not shown) standing thereon, the anchor may be formed as a structure which is engageable with the stud. In this embodiment, as illustrated, the anchor 7 is formed as an anchor-leg-shaped anchor adapted to be inserted into and brought into engagement with a workpiece. The anchor 7 include a base 10 to bring it into contact with a front surface of a workpiece, a shank 11 extending downward from the base 10, and resilient engagement pawls 13 biased away from the shank, extending obliquely from the front nd of the shank 11 toward the base 10, and suitable to be inserted into a mounting hole of the workpiece and brought into engagement with a rear surface of the workpiece. In order to cope with or absorb a difference in thickness of a workpiece, each of the engagement pawls 13 is formed with engagement steps.

Figure 3:
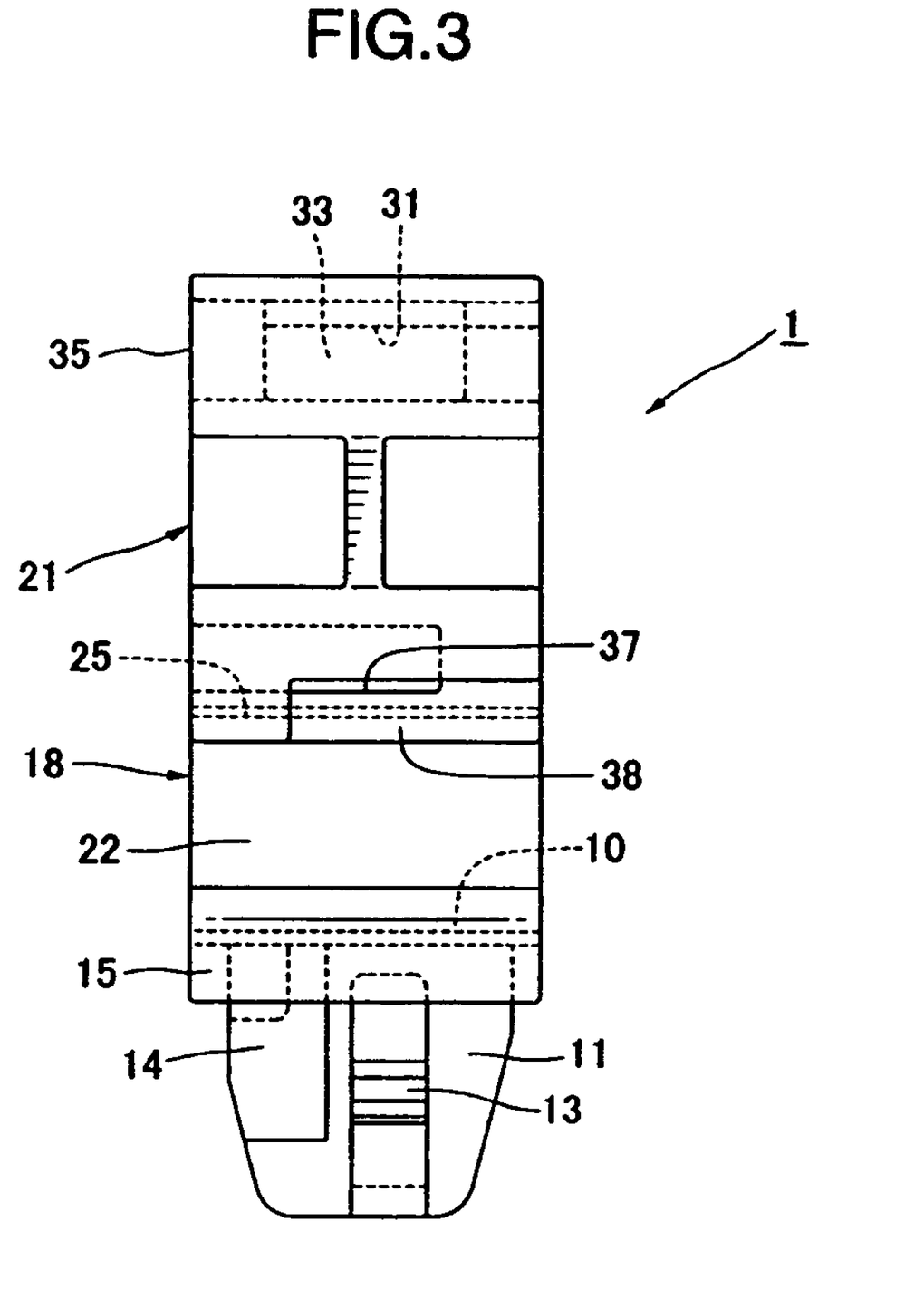
FIG. 3 is a right side view of the clamp in FIG. 1.
Figure 4:
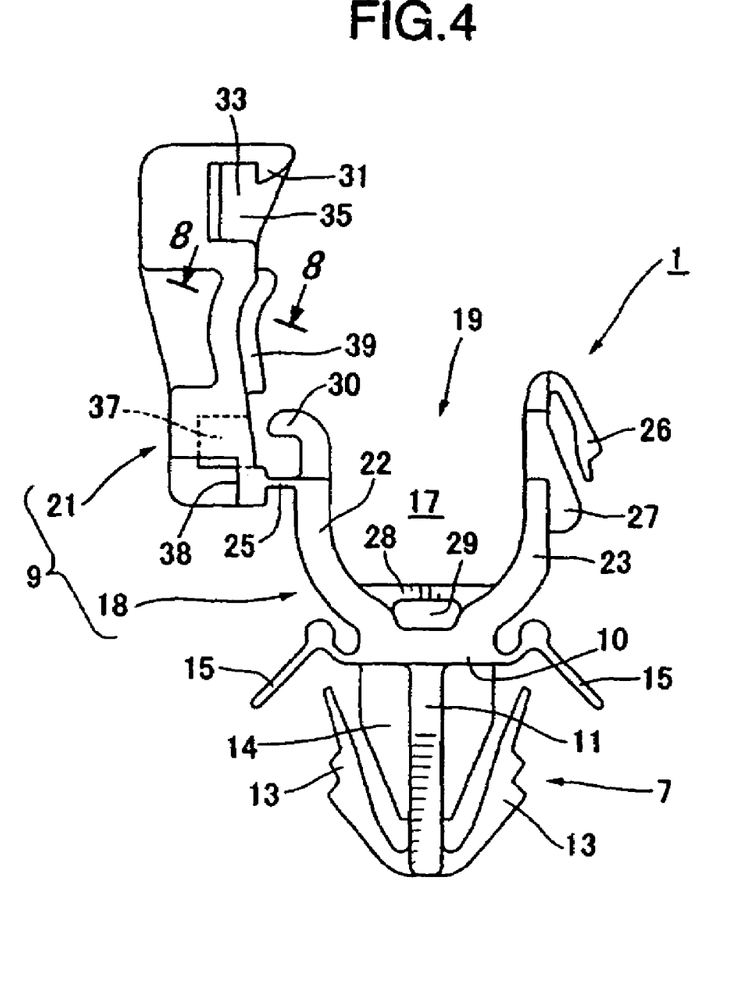
FIG. 4 is a rear view of the clamp in FIG. 1.
Figure 5:
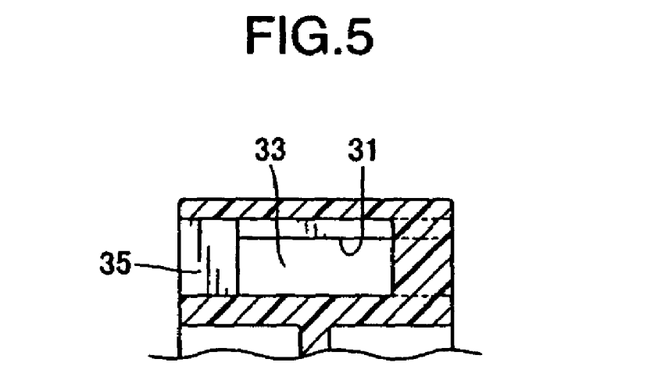
FIG. 5 is a sectional view of the clamp taken along the line 5—5 in FIG. 1.
Figure 6:
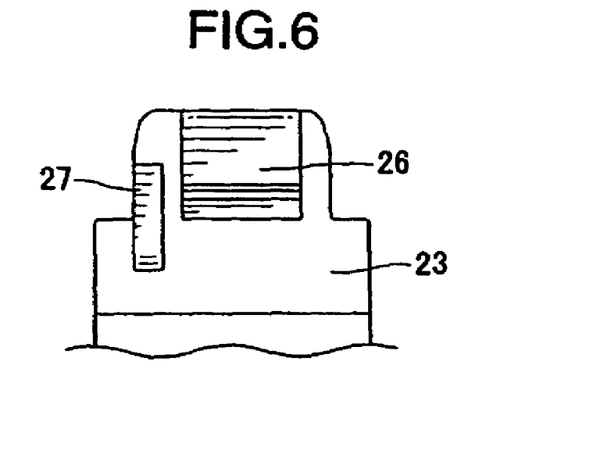
FIG. 6 is a view of the clamp in FIG. 2, seen in the direction of arrow 6.
Figure 7:
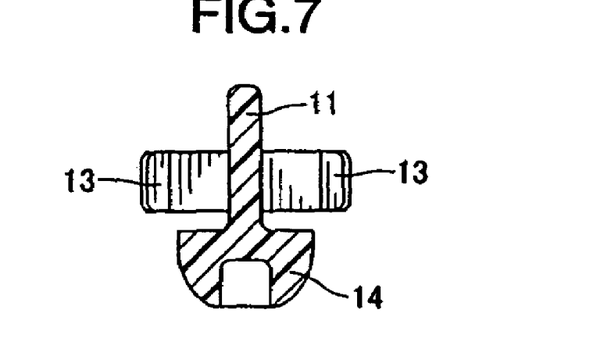
FIG. 7 is a sectional view of the clamp taken along the line 7—7 in FIG. 1.
Figure 8:
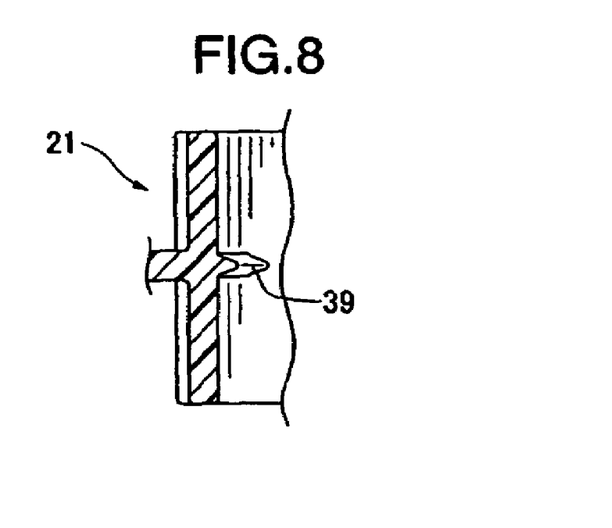
FIG. 8 is a sectional view of the clamp taken along the line 8—8 in FIG. 4.

As shown in FIGS. 1, 3, 4, and FIG. 7 (a sectional view taken along the line 7—7 in FIG. 1), the shank 11 is formed as a column of a generally plate-shaped member. A semicircular tubular portion 14 (best seen in FIG. 7) horizontally extended is formed at a position of the shank 11 close to the base 10. This semicircular tubular portion 14 is formed in conformity to the shape of a mounting hole of a workpiece to define the direction for attaching the anchor 7 and the direction of the clamp portion 9 after being attached to the workpiece. The anchor 7 also includes a pair of resilient wings 15 each extending from the base 10 toward an engagement pawl 13. The resilient wings 15 are adapted to resiliently engage the front surface of a workpiece. As shown in FIG. 3, each of resilient wings 15 is formed as a resilient plate-shaped member having the same width as that of the clamp 1 to provide a larger engagement area relative to a workpiece and maintain the engagement strength at a high level. Each of the resilient wings 15 is resiliently urged against th workpiece and acts to pull the shank 11 toward the workpiece so as to allow each of the engagement pawls 13 to press against the rear surface of the workpiece with increased force, to provide a strong engagement of the engagement pawl 13 with the workpiece. Even if the workpiece is varied in thickness, the resilient wings 15 can absorb the variance to maintain the engagement force of the engagement pawls 13 at a high level. Thus, one kind or type of cable clamp can be used even if the thickness of the workpiece is changed.

The clamp portion 9 includes a holder 18 having a receiving concavity 17 for receiving a cable therein, and a cover 21 for closing an opening 19 of the receiving concavity 17 of the holder. The holder 18 has a pair of walls 22, 23 defining a U-shaped receiving concavity 17. The pair of walls 22, 23 have a lower portion integrated with the base 10 of the anchor 7, and extending curvedly from the vicinity of the base 10 away from one another. Each of the walls 22, 23 has an upper portion extending substantially perpendicular to the base 10. A portion of wall 22 near the free end is integrally connected with one end of a thin plate-shaped hinge 25. The other end of the hinge 25 is integrally connected with a cover 21 adapted to be swung or rotated about the hinge 25 so as to open/close the inlet opening 19 of the holder 18. The free end of the other wall 23 is formed with a latch part 26 for allowing the cover 21 rotated about the hinge 25 to be latched in its closed state or condition. The latch part 26 is formed in an arm turned over from the free end of the wall 23, and can be resiliently deformed or bent to release the latch state of the cover 21. As shown in FIGS. 1, 2, 4, and FIG. 6 (viewed in the direction of the arrow 6 in FIG. 2), the latch part 26 is formed as a narrow plate-shaped member, and one of the right and left sides of the latch part 26 is formed with a rib-shaped guide 27 extending vertically. The guide 27 is associated with a guide wall of the cover 21 to prevent the cover 21 from being displaced or moved in the axial direction of a cable (that is, a direction perpendicular to the surface of the sheet of FIG. 1) after the cover 21 is closed.

A bridge 28 is formed in the region where the walls 22, 23 are connected to the base 10. The bridge 28 is formed in a shape having a portion spaced apart from a surface of the receiving concavity. The bridge 28 defines a hole 29 in cooperation with the surface of the base 10. The protection member formed in the receiving concavity 17 of the holder 18 can enter into the hole 29 and envelop the bridge 28. Thus, the protection member can be reliably fixed to the holder 18 and prevented from p eling. Further, in addition to the hinge 25, the end of the wall 22 having the hinge 25 is formed with an engagement hook 30 (latch part) adapted to engage with an engagement shoulder 38 (cooperable latch part) formed in an engagement hole 37 of the cover 21 when the cover 21 is in its closed state.

Figure 1:
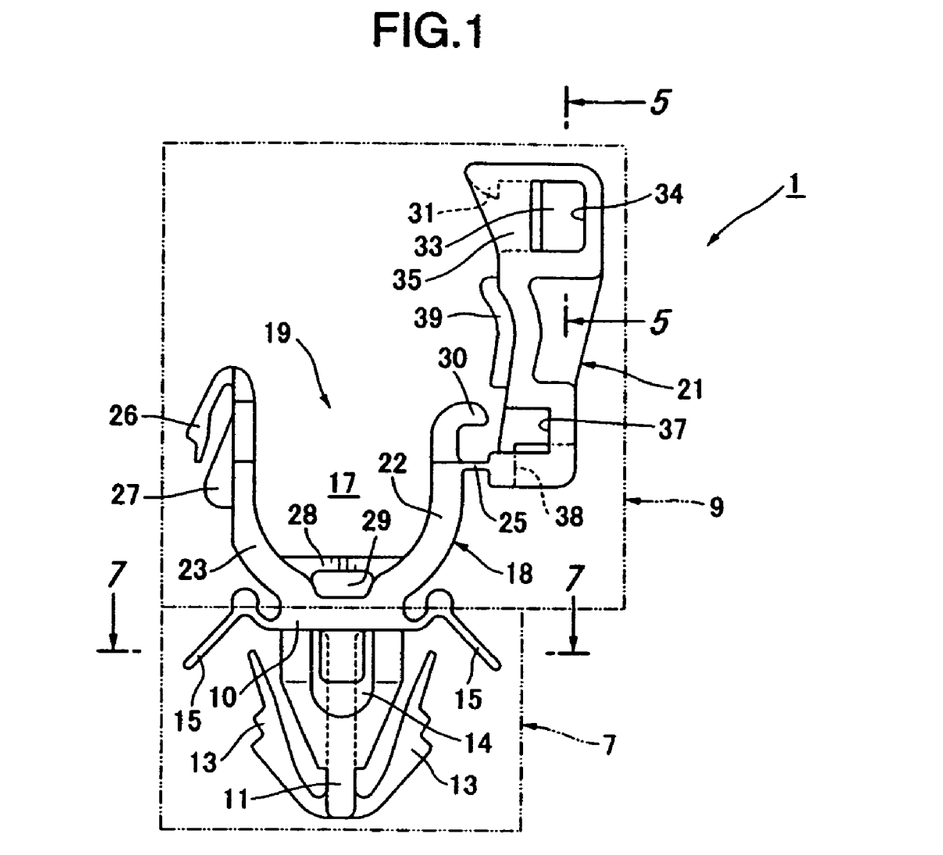
FIG. 1 is a front view of a clamp according to a first embodiment of the present invention, the clamp being shown before a protection member is attached.
Figure 2:
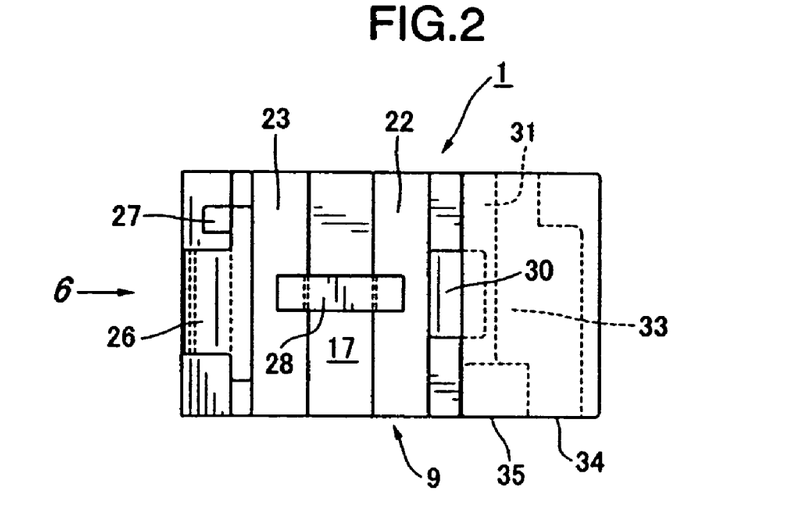
FIG. 2 is a top plan view of the clamp in FIG. 1.

The cover 21 is formed such that, in the initial state shown in FIG. 1, it extends upward substantially parallel to a vertically extending portion of the wall 22 through the hinge 25, which extends substantially horizontally from the end of the wall 22. Terms such as "upward", "vertically", and "horizontally" are used to describe relative orientations of parts as shown in the drawings and are not intended to limit the invention.

When the cover 21 is opened, it is maintained at a position allowing the receiving concavity 17 to be widely opened. When the cover 21 is in its open state, it does not occupy any substantial space in the horizontal direction. The space to be occupied by the cover can thus be reduced.

The cover 21 is preferably formed in a slightly curved shape in conformity to the outer surface of a cable received in the receiving concavity 17 of the holder 18 to hold the received cable when it is rotated about the hing 25. The end of the cover 21 on the opposite side of the hinge 25 is formed with a hook 31 serving as a latch part adapted to engage with the latch part 26 so as to maintain the cover 21 in its closed state. A space 33 for receiving the latch part 26 therein is formed at a position adjacent to the hook 31. A side surface of this space 33 is in communication with a window 34. The tip of a screwdriver can be inserted from this window to release the latch. As shown in FIG. 1, a guide wall 35 is formed to extend from the window 34 toward the front end of the hook 31. In cooperation with the guide 27 of the latch part 26, the guide wall 35 prevents the cover 21 from being displaced or moved in the axial direction of a cable (that is, the direction perpendicular to the surface of the sheet of FIG. 1) after the cover 21 is closed.

As stated earlier, the end of the cover 21 on the side of the hinge 25 is formed with an engagement hole 37 for receiving an engagement hook 30 (latch part) of the wall 22. A part of the edge of the engagement hole 37 is formed as an engagement shoulder 38 (cooperable latch part) adapted to engage with the engagement hook 30. The engagement between the engagement hook 30 and the engagement shoulder 38 allows the cover to be maintained in its closed state even if the hinge 25 is broken.

A portion of the cover for pressing the outer surface of a cable is formed with a protrusion rib 39 extending narrowly in the peripheral direction of the outer surface of the cable. When the cover 21 is closed, the protrusion rib 39 presses the cable through the protection member to prevent the cable from being moved in the axial direction of the cable. Thus, the cable can be more strongly held.

In the present invention, after the clamp 1 illustrated in FIGS. 1 to 8 is integrally formed as the primary product, a flexible protection member 2 made of soft synthetic resin material such as thermoplastic elastomer (TPE) is joined with the clamp 1 at a predetermined position of the clamp portion 9 as shown in FIGS. 9 and 10 to form a cable clamp 3 as a secondary product according to the present invention. The protection member 2 includes a holder-side portion 41 joined to the bottom side of the receiving concavity 17 of the holder 18 to cover the lower side of the outer surface of a cable received in the receiving concavity 17 of the holder 18 of the clamp portion 9, and a cover-side portion 42 standing and extending from the holder-side portion 41 at a position adjacent to the hinge 25 to cover the remaining outer surface or the upper side of the outer surface of the cable. Through a double-shot (injection) molding or insert molding, the protection member 2 may be formed such that the holder-side portion 41 joins with the bottom surface of the receiving concavity 17, and the cover-side portion 42 upstandingly extends apart from and in parallel to the cover 21. The protective member 2 is made of flexible material which allows the cover-side portion 42 to be deformed to protect the outer surface of the cable from damage. A typical material may include thermoelastic elastomer (TPE). The holder-side portion 41 may be fixed onto the surface of the holder 18 by fusion-bonding or melting. Further, in the melted state, the holder-side portion 41 enters the hole 29 of the bridge 28, and envelops the bridge 20. In this state, the holder-side portion 41 is solidified, and reliably fixed to the holder 18 so as to eliminate any risk of peeling of the holder-side portion from the holder 18. The holder-side portion 41 is formed with a cable-receiving groove 43 to facilitate the positioning of a cable.

In the protection member, the cover-side portion 42 is integral (unitary) with the holder-side portion 41, and formed to extend substantially parallel to the cover 21 standing vertically in its open state, up to an intermediate height of the cover 21. The cover-side portion 42 is made of a flexible material such as TPE, and stands upright from the holder-side portion 41. Thus, a cable can be readily received in the cable-receiving groove 43 of the holder-side portion 41. When the cover 21 is closed after positioning of a cable, the cover-side portion 42 is pressed against the cable by the cover to envelop or embrace an outer surface of the cable which is not enveloped or embraced by the holder-side portion 41, that is, the upper side of the outer surface of the cable. Thus, a separate operation of wrapping the protective member around the cable can be eliminated. The cover-side portion 42 extends upright in parallel to the cover 21 under its open condition, without any contact with the cover 21. Thus, the cable can be positioned on the protective member without widely opening the cover 21, so as to facilitate an attaching operation in a narrow space.

With reference to FIGS. 11 and 12, an operation of attaching a cable 5, such as the ABS sensor cable, to a body panel 6 will be described. In FIG. 11, as shown by arrow 45, an operator positions the cable 5 in the cable-receiving groove 43 of the holder-side portion 41 of the protection member 2 fixed to the receiving concavity 17 of the holder 18 of the cable clamp 3. After positioning the cable 5 in the cable-receiving groove 43, the cover 21 is rotated about the hinge 25 in the direction of the arrow 46 in FIG. 12 to deformably press the cover-side portion 42 of the protection member toward the cable so as to allow the cover-side portion 42 to envelop the upper side of the outer surface of the cable which is not enveloped by the holder-side portion 41. Through this operation, the cable 5 is protectively enveloped by the protection member 2. When the cover 21 is rotated to the position in FIG. 12, the latch part 26 engages the cooperable latch part 31 to latch the cover 21 in its closed state. In the closed state, the engagement shoulder 38 adjacent to the hinge 25 engages the engagement hook 30 of the holder 18 adjacent to the hinge 25 to maintain the closed state even if the hinge 25 is broken.

In the closed state of the cover 21, the projecting rib 39 formed on the cover 21 strongly presses the cover-side portion 42 of the protection member against the outer surface of the cable 5. Thus, the cable 5 is reliably prevented from being displaced in the axial direction thereof, and the clamp 9 holds the cable 5 without any axial movement of the cable 5. Thus, the axial displacement of the cable 5 can be prevented even after the cable clamp 3 is attached to the body panel 6. The shank 11 and the engagement pawls 13 of the anchor 7 are inserted into a mounting hole 47 of the body panel 6, and the engagement steps of the pawls 13 engage the rear surface of the body panel 6 to fix the cable clamp 3 to the body panel 6. The resilient wings 15 of the anchor 7 resiliently engage the front surface of the body panel 6 to pull the engagement pawls 13 upward so as to provide enhanced engagement force, and adequately maintain the engagement force of the engagement pawls 13 irrespective of variation in thickness of the body panel 6.

The sequence or order of both the holding step of the cable 5 by the cable clamp 3 and the fixing step of the cable clamp 3 to the body panel 6 may be arbitrarily or selectively determined. Thus, after positioning of the cable 5 to the cable clamp 3, the cable clamp 3 may be attached to body panel 6. Alternatively, after attaching the cable clamp 3 to body panel 6, the cable 5 may be positioned to the cable clamp 3.

As mentioned above, a single operation, that is, the closing of the cover 21, allows the cable 5 to be held by the cable clamp and simultaneously be enveloped by the protective member 5 around the cable. This eliminates the need for applying the protection member in a separate operation. The cover-side portion of the protection member upstandingly extends apart from the cover under its open condition. Thus, the cable can be readily positioned on the protection member without widely opening the cover, so as to facilitate an attaching operation in a narrow space.

Figure 13:
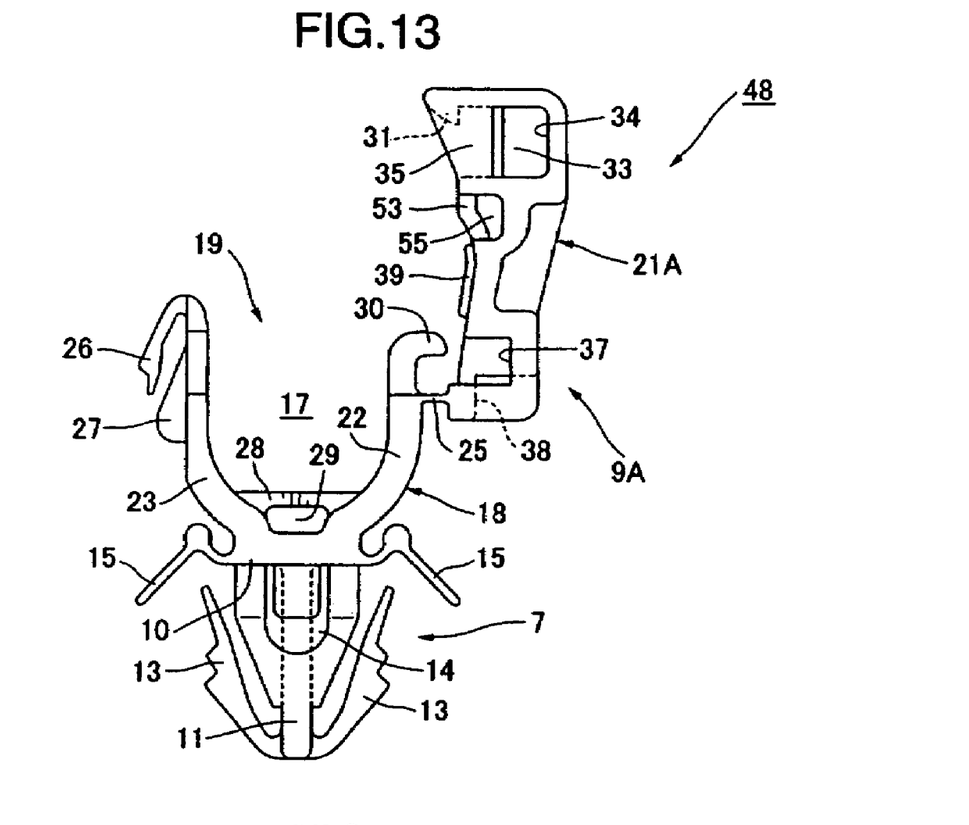
FIG. 13 is a front view of a cable clamp according to a second embodiment of the present invention, the cable clamp being shown before a protection member is attached.
Figure 14:
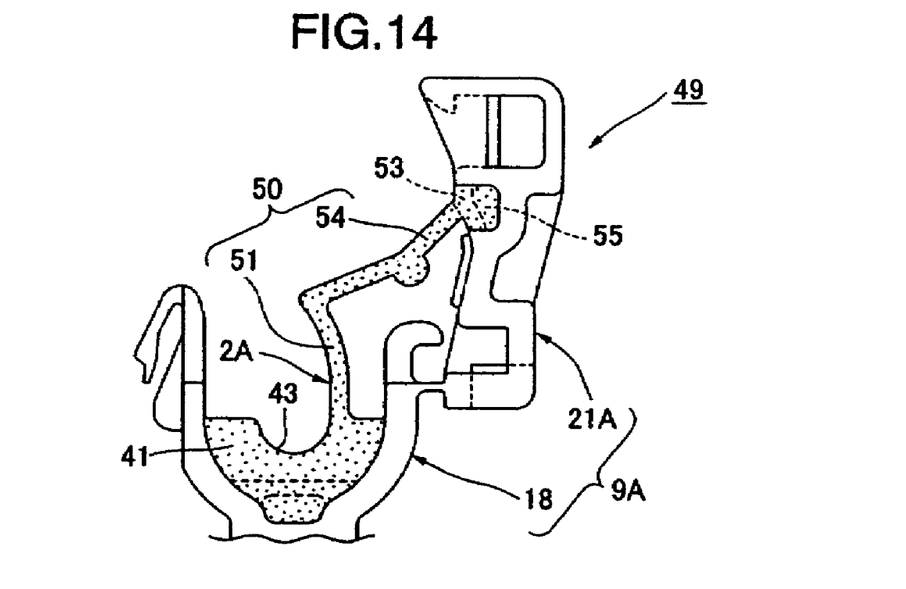
FIG. 14 is a front view of a cable clamp according to a second embodiment of the present invention, the cable clamp being shown after a protection member is attached.
Figure 15:
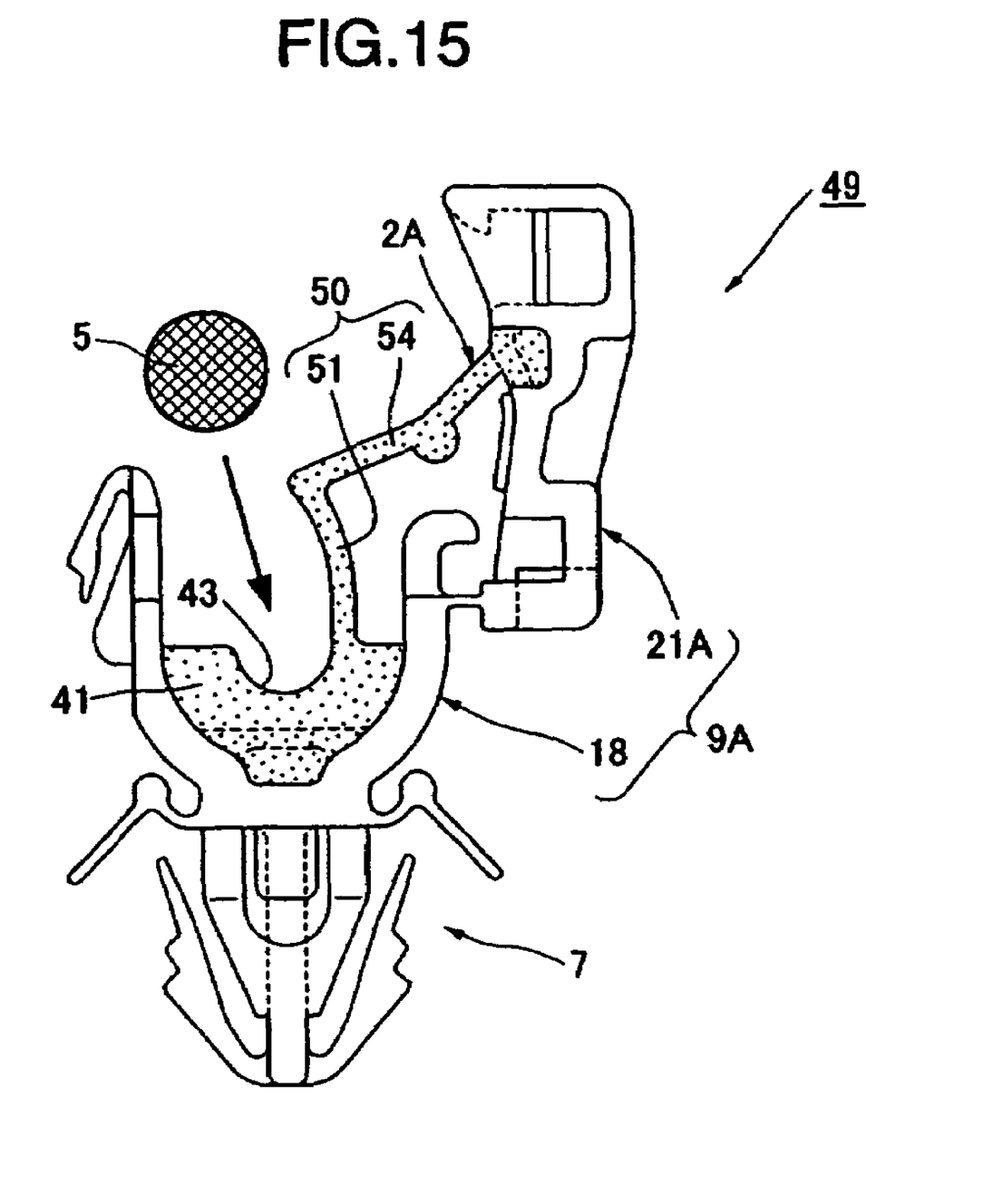
FIG. 15 is a front view of the cable clamp in FIG. 13 before a cable is held by the cable clamp.

FIGS. 13 to 15 show a cable clamp according to a second embodiment of the present invention, in which the protection member 2A in FIG. 14 is joined to the primary product clamp 48 in FIG. 13. In general, the structural difference between the cable clamp 49 of the second embodiment and the cable clamp 3 of the first embodiment is that, as illustrated in FIG. 14, a cover-side portion 50 of a protection member 2A having an upright segment 51 standing upright substantially parallel to a cover 21A up to an intermediate height of the cover 21A, has an extension segment 54 extending continuously from the upright segment 51 and having an end connected to a coupling portion 53 in the upper portion of the cover 21A; and the cover 21A has the coupling portion 53 to be connected with the end of the extension segment 54. The remaining structures are substantially the same as those of the cable clamp 3 of the first embodiment. In the components of the cable clamp illustrated in FIGS. 13 to 15, the same components as those of the cable clamp 3 of the first embodiment are defined by like reference numerals, and the descriptions of them will be omitted. As needed, refer to the description on the cable clamp 3 of the first embodiment.

More particularly, as to the cable clamp 49 (including clamp 48 in FIG. 19), different components from the cable clamp 3 of the first embodiment will be described below. As shown in FIGS. 14 and 15, the protection member 2A formed in a clamp 9A includes the holder-side portion 41 fixed to the holder 18, and the cover-side portion 50. The cover-side portion 50 has the upright segment 51 standing substantially parallel to a cover 21A up to an intermediate height of the cover 21A, and the extension segment 54 extending continuously from the upright segment 51 toward the cover 21A and having an upper end connected to the coupling portion 53 in the upper portion of the cover 21A. The upper end of the extension segment 54 may be formed such that it is fusion-bonded to the coupling portion in the upper potion of the holder 18 at the same time when the protection member 2A is formed. The coupling portion 53 is formed within a hole 55 similar to the bridge 28 of the holder 18 having the hole 29. The upper end of the extension segment 54 of the protection member 2A enters into the hole 55 of the coupling portion 53, which envelops the coupling portion 53. Thus, the extension segment 54 of the protection member 2A is reliably fixed to the coupling portion 53 to prevent the peeling of the extension segment 54 from the coupling portion 53.

The extension segment 54 can block a portion of the opening of concavity 17 between the upper end of the upright segment 51 and the cover 21A. Thus, as shown in FIG. 15, the cable 5 can never enter between the upright segment 51 and the cover 21A, preventing wrong alignment of the cable 5 with the groove 43. More specifically, as shown in FIG. 15, the cover-side portion 50 including the extension segment 54 and the upright segment 51 can guide the cable 5 to the cable receiving groove 43 of the holder-side portion 41 to allow the cable 5 to be reliably positioned in the cable receiving groove 43 of the holder-side portion 41 of the protection member 2A.

According to the present invention, positioning of a cable, such as an ABS sensor cable, on the holder-side portion of the protection member and then closing of the cover allows the cable to be held by the cable clamp and simultaneously be enveloped with the protective member around the cable. This eliminates the need for applying the protection member in separate operations. The anchor and the clamp portion are integrally molded as one piece with hard resin material, and the cable protected by the flexible protection member is pressed to the holder by the cover and held by the clamp portion. Thus, the cable is held firmly and protectively. Furthermore, the cover-side portion of the protection member stands and extends in parallel to the cover under its open condition, without any contact with the cover. Thus, the cable can be readily positioned on the protection member without widely opening the cover, so as to facilitate an attaching operation in a narrow space.

While preferred embodiments of the invention have been shown and described, it will be apparent that modifications can be made without departing from the principles and spirit of the invention, the scope of which is defined in the appended claims.

What is claimed is:

1. A cable clamp comprising:
  an anchor adapted to be fixed to a workpiece:
  a clamp portion for holding a cable; and
  a unitary flexible protection member for allowing a cable to be protectively held by the clamp portion,
  wherein the anchor and the clamp portion are integrally molded as one piece of hard resin material,
  the clamp portion includes a holder having a concavity for receiving a cable therein, the concavity having a base portion and a pair of walls extending in a direction substantially perpendicular to the base portion, and a cover movable from an open position, in which the cover extends in said direction, to a closed position for closing an opening of the concavity of the holder, the cover having a first end connected to a first end of the holder adjacent to the opening, by a hinge, a second end of the cover and a second end of the holder adjacent to the opening having cooperable latch parts formed to be latched to one another, and
  the protection member includes a holder-side portion fixed to the holder and constructed to partially envelop an outer surface of a cable received in the concavity, and a cover-side portion extending continuously from the holder-side portion at a position adjacent to the hinge, wherein the cover-side portion is spaced from the cover and extends in said direction when the cover is in the open position and is constructed to be pressed onto the cable by the cover in response to movement of the cover to the closed position, so as to partially envelop the outer surface of a cable not enveloped by the holder-side portion.

2. The cable clamp as defined in claim 1, wherein said concavity has a U-shaped configuration, and the cover is formed to extend from an end of one of the walls adjacent to the hinge substantially parallel to a region of the one of the walls when the cover is in the open position.

3. The cable clamp as defined in claim 2, wherein the cover-side portion of the protection member has a length which extends substantially parallel to the cover up to an intermediate height of the cover when the cover is in the open position.

4. The cable clamp as defined in claim 3, wherein the cover-side portion of the protection member has an extension extending continuously therefrom and having an end connected to a portion of the cover.

5. The cable clamp as defined in any one of claims 1 to 4, wherein a portion of the cover for pressing an outer surface of a cable through the protection member has a rib that projects from the cover and that is disposed to press the cable through the protection member upon movement of the cover to the closed position to prevent the cable from being axially moved.

6. The cable clamp as defined in any one of claims 1 to 4, wherein the first end of the holder and the first end of the cover are formed with cooperable latch parts constructed to be connected with one another when the cover is in the closed position.

7. The cable clamp as defined in any one of claims 1 to 4, wherein the anchor includes a base disposed to face a front surface of the workpiece, at least one engagement pawl disposed for insertion into a mounting hole of the workpiece for engagement with a rear surface of the workpiece, and a pair of resilient wings extending from the base for resiliently engaging the front surface of the workpiece so as to absorb a change in thickness of the workpiece to maintain engagement of the engagement pawl with the rear surface of the workpiece.

8. The cable clamp as defined in any one of claims 1 to 4, wherein the anchor and the clamp portion are a one-piece primary integral molding of hard resin, and a bridge in the receiving concavity of the holder defines a hole between the bridge and a surface of the concavity, and wherein the protection member is a secondary molding in which the holder-side portion envelops the bridge.

9. A cable clamp comprising:
a holder having a concavity for receiving a cable therein, the concavity having a base portion and the pair of walls extending in a direction substantially perpendicular to the base portion, and a cover movable from an open position, in which the cover extends in said direction, to a closed position for closing an opening of the concavity;
a unitary protection member in the concavity and having a first portion shaped to receive and to embrace a cable at one side thereof, and a second portion that embraces the cable at an opposite side thereof when the cover is in the closed position, the second portion being integral with the first portion and being spaced from the cover and extending in said direction when the cover is in the open position.

10. A cable clamp according to claim 9, wherein the protection member has a third portion that connects the cover and an end of the second portion remote from the first portion.

11. A cable clamp according to claim 9 or 10, wherein the cover is connected to the holder by a hinge at one side of the concavity of the holder.

12. A cable clamp according to claim 9 or 10, wherein the holder and the cover have cooperable latch parts constructed to latch the cover closed.

13. A cable clamp comprising:
a holder having a concavity for receiving a cable therein, the concavity having a base portion and a pair of walls extending in a direction substantially perpendicular to the base portion;
a cover constructed to move from an open position, in which the cover extends in said direction, to a closed position to close an opening of the cavity; and
a unitary protection member fixed to the holder and having a first portion with a groove for receiving and embracing a portion of a cable and a second portion that extends continuously from the first portion, that is spaced from the cover and extends in said direction when the cover is in the open position, that is moved by the cover as the cover moves to the closed position, and that is deformed to embrace another portion of the cable.

14. A cable clamp according to claim 13, wherein the second portion is free of the cover before the cover moves to close the opening of the concavity.

15. A cable clamp according to claim 13 or 14, wherein the second portion has an extension that is connected to the cover and that blocks a portion of the opening of the concavity.

16. A cable clamp according to claim 13 or 14, wherein the holder and the cover have cooperable latch parts for latching the cover to the holder when the cover closes the opening of the concavity.

17. A cable clamp according to claim 13 or 14, wherein the cover is connected to the holder by a hinge.

18. A cable clamp according to claim 13 or 14, wherein the concavity is U-shaped with one of said walls connected to the cover by a hinge and the other wall provided with a latch part cooperable with a latch part on the cover.

19. A cable clamp according to claim 13 or 14, wherein the protection member is a material that is softer than the material of the holder.

20. A cable clamp according to claim 13 or 14, wherein the holder has an anchor portion for attachment to a panel.

21. A cable clamp according to claim 20, wherein the anchor portion is constructed and disposed to pass through an opening in the panel and project from one side of the panel and has at least one resilient pawl constructed and disposed to engage the one side of the panel to maintain the anchor portion in the opening.

22. A cable clamp according to claim 21, wherein the holder has a pair of resilient members constructed and disposed to engage an opposite side of the panel.

* * * * *